(12) United States Patent
Yuan

(10) Patent No.: US 12,724,322 B2
(45) Date of Patent: Sep. 1, 2026

(54) MAGNETICALLY ATTRACTABLE FILTER DEVICE

(71) Applicant: Zhuhai Cufu Optical Technology Co., Ltd., Zhuhai (CN)

(72) Inventor: Guokui Yuan, Zhuhai (CN)

(73) Assignee: Zhuhai Cufu Optical Technology Co., Ltd., Zhuhai (CN)

( * ) Notice: Subject to any disclaimer, the term of this patent is extended or adjusted under 35 U.S.C. 154(b) by 130 days.

(21) Appl. No.: 18/922,703

(22) Filed: Oct. 22, 2024

(65) Prior Publication Data

US 2026/0063969 A1 Mar. 5, 2026

(30) Foreign Application Priority Data

Sep. 4, 2024 (CN) ......................... 202422160359.7

(51) Int. Cl.
*G03B 11/00* (2021.01)

(52) U.S. Cl.
CPC .................................... *G03B 11/00* (2013.01)

(58) Field of Classification Search
CPC ...................................................... G03B 11/00
USPC .......................................................... 396/544
See application file for complete search history.

(56) References Cited

U.S. PATENT DOCUMENTS 5,208,624 A * 5/1993 MacKay ................ G03B 17/12 396/530
2024/0094449 A1* 3/2024 Wang ....................... G02B 5/26

FOREIGN PATENT DOCUMENTS

CN 210465810 U 5/2020

* cited by examiner

*Primary Examiner* — Joel W Fosselman
(74) *Attorney, Agent, or Firm* — Westbridge IP LLC

(57) ABSTRACT

A magnetically attractable filter device includes an adapter ring, designed to be arranged at the front end of a lens; one or more filters, each of which includes a filter frame and a lens element, with the lens element mounted on the filter frame. The filters are sequentially stacked at the front end of the adapter ring, with the adapter ring and the adjacent filters being magnetically attracted to each other, adjacent filters being magnetically attracted to each other. Magnetically attracted ends of the adapter ring and the filter frames of the adjacent filters, as well as magnetically attracted ends of the filter frames of the adjacent filters, are respectively provided with a first locking part and a second locking part. The first locking part and the second locking part engage with each other to achieve locking through mutual rotations between the adapter ring and the filter, between the filters.

12 Claims, 4 Drawing Sheets

MAGNETICALLY ATTRACTABLE FILTER DEVICE

CROSS-REFERENCE TO RELATED APPLICATIONS

This application claims priority to Chinese Patent Application No. 202422160359.7, filed on Sep. 4, 2024, the content of which is incorporated herein by reference in its entirety.

TECHNICAL FIELD

The present disclosure belongs to the technical field of photography equipment, and particularly relates to a magnetically attractable filter device.

BACKGROUND

At present, filters are one of the most commonly used pieces of photography equipment. Among them, magnetically attractable filters are favored by many photography enthusiasts for their ease of use and installation. However, the applicant has discovered that existing magnetically attractable filters on the market have the problem of being prone to falling off when touched at certain points (specific locations) during use, resulting in lower safety.

SUMMARY

To solve the above-mentioned problems in the prior art, the present disclosure provides a magnetically attractable filter device.

To address the technical problems mentioned above, the present application adopts the following technical solution.

The magnetically attractable filter device described in the present disclosure comprises:

- an adapter ring, designed to be arranged at a front end of a lens; and
- one or more filters, each of the filters comprising a filter frame and a lens element, the lens element being mounted on the filter frame. When in use, the one or more filters are sequentially stacked at a front end of the adapter ring, and the adapter ring and adjacent filters are magnetically attracted to each other, and the adjacent filters are magnetically attracted to each other.

Furthermore, magnetically attracted ends of the adapter ring and the filter frames of the adjacent filters, and magnetically attracted ends of the filter frames of the adjacent filters are respectively provided with a first locking part and a second locking part. The first locking part and the second locking part engage with each other to achieve locking through mutual rotations between the adapter ring and the filter, and between the filters.

Further, front end surfaces of the adapter ring and the filter frame are both provided with a first protruding ring. The first protruding ring is provided with the first locking part. A rear end surface of the filter frame is provided with a second protruding ring. The second protruding ring is provided with the second locking part corresponding to the first locking part. When assembled for use, the second protruding ring and the second locking part are both arranged in an inner ring of the first protruding ring, and the second locking part engages with or disengages from the first locking part following a relative rotation of the second protruding ring and the first protruding ring.

Further, the number of the first locking part is two or more, and they are distributed in a ring shape on the first protruding ring. The number of the second locking part is two or more, and they are distributed in a ring shape on the second protruding ring.

Further, the first protruding ring is provided with two, three, or four of the first locking parts. The first locking parts are arranged in an annular array. The second protruding ring is provided with two, three, or four of the second locking parts. The second locking parts are also arranged in an annular array.

Further, the first locking part protrudes and extends towards an axial direction of the first protruding ring, and forms a locking position on the first protruding ring. When locked, the second locking part rotates into the locking position and engages with the first locking part.

Further, the first locking part is provided on an inner wall of the first protruding ring, and correspondingly, the second locking part is provided on an outer wall of the second protruding ring.

Further, the first locking part is provided on an outer wall of the first protruding ring, and correspondingly, the second locking part is provided on an inner wall of the second protruding ring.

Further, a peripheral surface of the filter frame is provided with a lug to facilitate the assembly and disassembly of the filter.

Further, an outer end of the lug is provided with a recess, and a recessed surface of the recess is provided with an anti-slip pattern.

Further, the number of the lug is two or more, and they are arranged in an annular array on the peripheral surface of the filter frame.

Further, a peripheral surface of the adapter ring is provided with a locking mark, and the locking mark is aligned with one of the first locking parts on the adapter ring.

Further, the magnetically attractable filter device further comprises a protective cover. The protective cover is stacked at a front end of the filter when in use, and magnetically attracted to the filter. The magnetically attracted ends respectively provided with the first locking part and the second locking part.

Advantages of the present disclosure are as follows.

According to the present disclosure, the above technical solution achieves locking and unlocking between the adapter ring and adjacent filters, as well as between adjacent filters, by rotating the filters. This improves the safety during use, solves the problem of existing magnetically attractable filters being prone to separation and falling off during use, and enhances the convenience and safety of carrying. Furthermore, the locking and unlocking operations are simple, convenient, and quick.

DETAILED DESCRIPTION OF THE EMBODIMENTS

To make the objectives, technical solutions, and advantages of the present disclosure clearer, the disclosure is further described in detail below in conjunction with the accompanying drawings and embodiments. It should be understood that the specific embodiments described herein are only for the purpose of explaining the present disclosure and are not intended to limit the scope of the disclosure.

Figure 1:
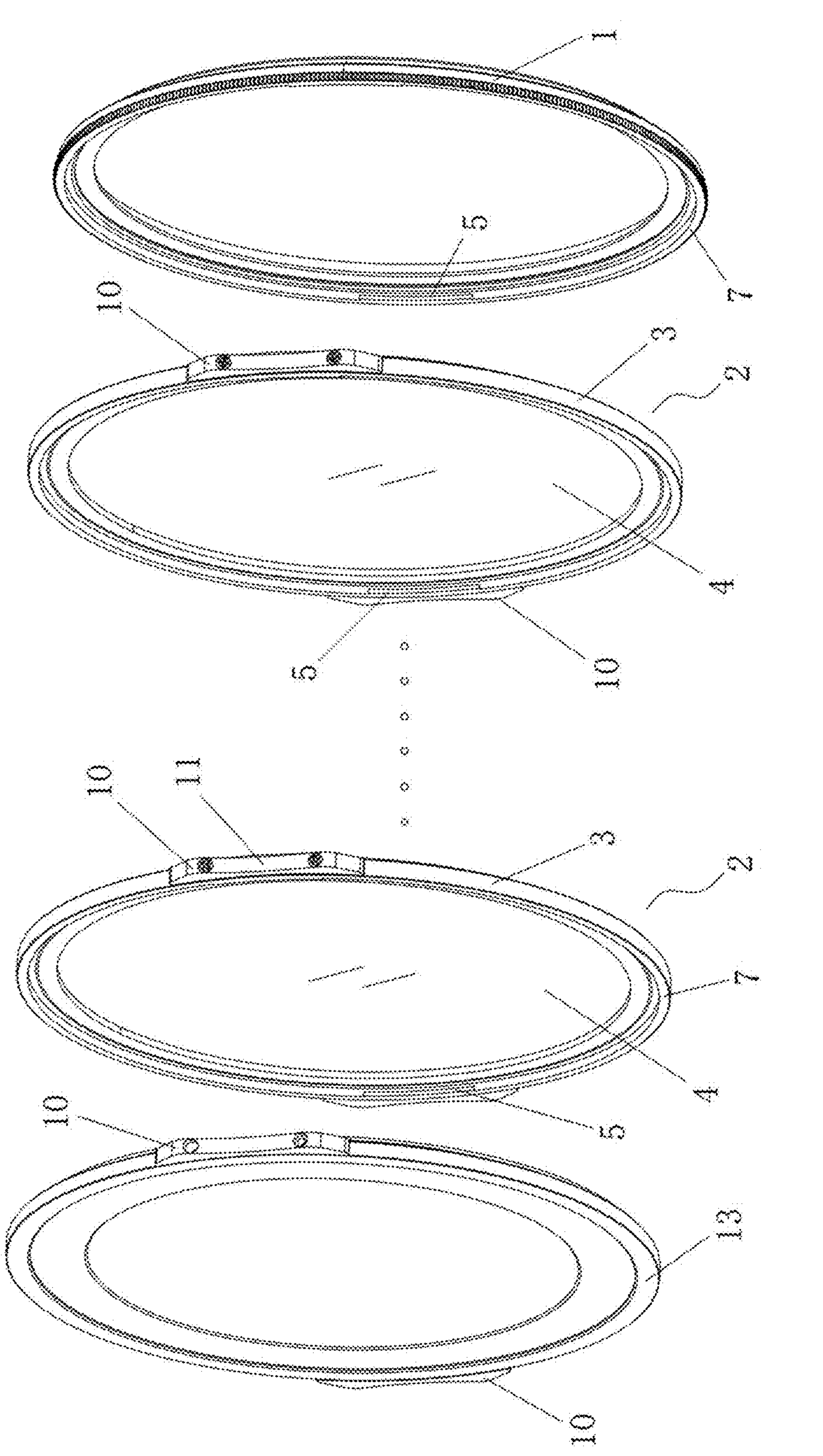
FIG. 1 is a schematic structural diagram of the magnetically attractable filter device according to an embodiment of the present disclosure.

Referring to FIG. 1, the magnetically attractable filter device according to the embodiment of the present disclosure comprises an adapter ring 1 and one or more filters 2.

The adapter ring 1 is designed to be arranged at a front end of a lens. Specifically, the rear end of the adapter ring 1 is provided with a threaded portion 14. The adapter ring 1 is removably mounted on the front end of the lens through the threaded part 14.

The filter 2 comprises a filter frame 3 and a lens element 4. The lens element 4 may be one of a star filter, UV filter, polarizing filter, soft focus filter, or neutral density (ND) filter, and is mounted on the filter frame 3. As shown in the figures, the filter frame 3 is an annular frame, and the lens element 4 is mounted within the ring in the middle of the annular frame.

When using the magnetically attractable filter device of the present disclosure, the adapter ring 1 is first arranged at the front end of the lens. Then, depending on the shooting needs, one or more filters 2 are sequentially stacked at the front end of the adapter ring 1. At this time, adapter ring 1 and adjacent filters 2 are magnetically attracted to each other, and the adjacent filters 2 are magnetically attracted to each other. Specifically, the mutual magnetic attraction between the adapter ring 1 and the adjacent filters 2, as well as between adjacent filters 2, is achieved through magnetic blocks embedded in them (i.e., magnetic blocks pre-embedded in the adapter ring 1 and the filter frame 3 of the filter 2). This technology belongs to the prior art, and therefore will not be described in further detail here.

Figure 2:
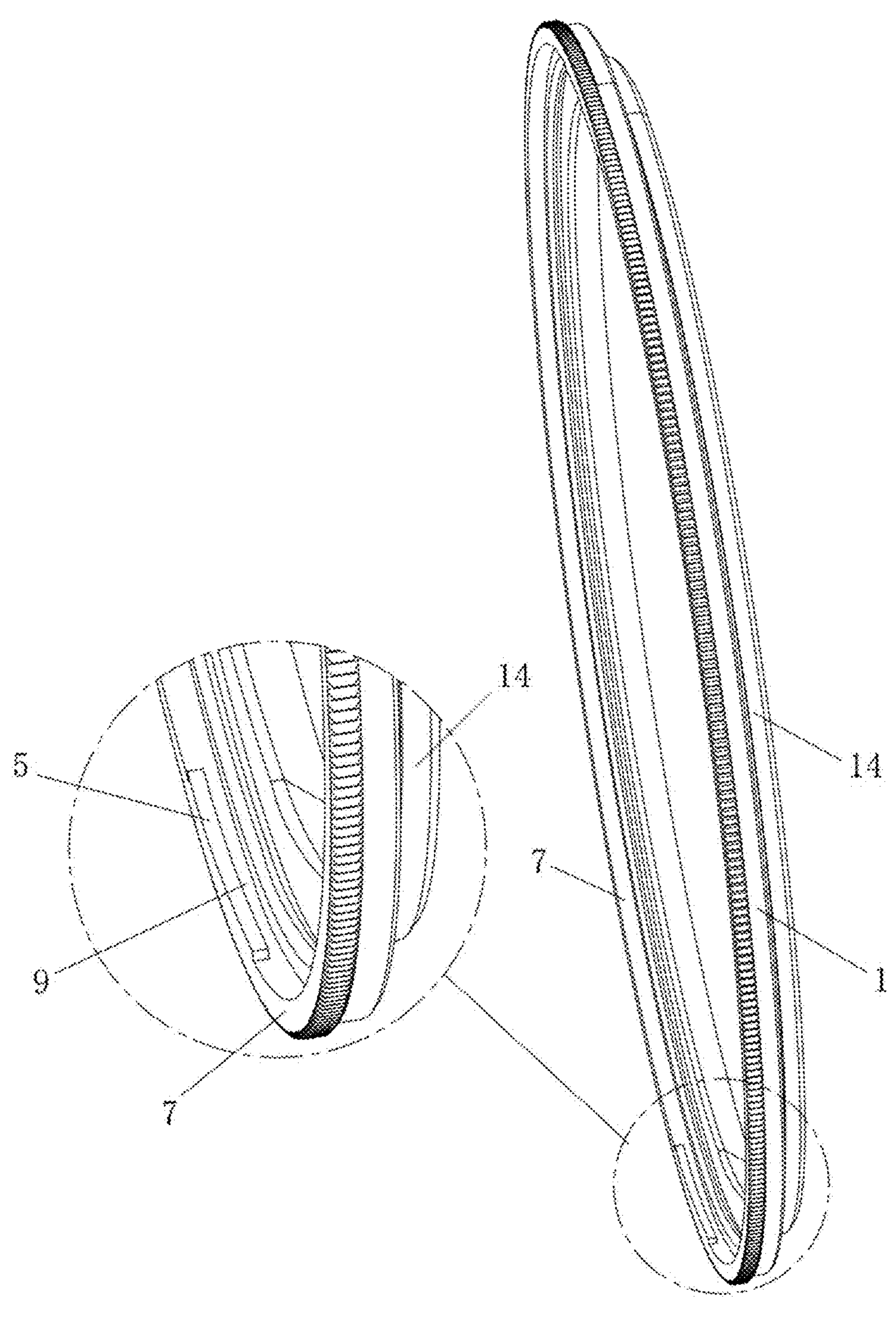
FIG. 2 is a schematic structural diagram of the adapter ring in the magnetically attractable filter device according to an embodiment of the present disclosure.

As shown in FIGS. 1-4, magnetically attracted ends of the adapter ring 1 and the filter frames 3 of the adjacent filters 2, as well as magnetically attracted ends of the filter frames 3 of the adjacent filters 2, are respectively provided with a first locking part 5 and a second locking part 6. Specifically, the structure can be as follows: front end surfaces of the adapter ring 1 and the filter frame 3 are both provided with a first protruding ring 7. The first locking portion 5 is provided on an inner wall of the first protruding ring 7, and the rear end surface of the filter frame 3 is provided with a second protruding ring 8. The outer wall of the second protruding ring 8 is provided with the second locking part 6. The number of the first locking parts 5 is two or more, and they are distributed in a ring shape on the inner wall of the first protruding ring 7. The first locking portion 5 protrudes and extends towards an axial direction of the first protruding ring 7, and forms a locking position 9 on the inner wall of the first protruding ring 7 (specifically, the first locking part 5, the inner wall of the first protruding ring 7, and the front end surface of the adapter ring 1 or the front end surface of the filter frame 3 together form the locking position 9, as shown in FIG. 2). The number of the second locking part 6 is two or more, and they are distributed in a ring shape on the outer wall of the second protruding ring 8. Preferably, two (or three or four) first locking parts 5 are arranged in an annular array on the inner wall of the first protruding ring 7, and two (or three or four) second locking parts 6 are arranged in an annular array on the outer wall of the second protruding ring 8. The first locking part 5 and the first protruding ring 7 form an integrated structure with the adapter ring 1 or the filter frame 3 of the filter 2, and the second locking part 6 forms an integrated structure with the filter frame 3 of the filter 2.

When assembling and using the magnetically attractable filter device, the second protruding ring 8 and the second locking part 6 are both arranged in an inner ring of the first protruding ring 7, and by rotating the filter 2, the second protruding ring 8 and the first protruding ring 7 rotate relative to each other. The second locking part 6, following the rotation of the second protruding ring 8, moves within the inner ring of the first protruding ring 7 until it overlaps and engages with the first locking part 5 (i.e., the second locking part 6 rotates into the locking position 9 and engages with the first locking part 5), thereby achieving the locking of the adapter ring 1 with the adjacent filters 2 and the locking of adjacent filters 2. This improves the safety during use, solves the problem of existing magnetically attractable filters being prone to separation and falling off during use, and enhances the convenience and safety of carrying. To detach, simply continue rotating or rotating the filter 2 in the opposite direction, allowing the second locking part 6 to completely disengage from the first locking part 5, thereby unlocking the adapter ring 1 from the adjacent filters 2 and unlocking adjacent filters 2, allowing the filters 2 to be removed.

In addition, on the market, existing magnetically attractable filters often face the problem of difficulty in separating the adapter ring and filters, as well as between filters, due to the directionality of the magnetic force. Users typically have to use their fingernails to pry between the adapter ring and the filters or between the filters, making detachment inconvenient and often leading to contact with the lens element, causing contamination of the lens element and even breaking fingernails.

Figure 3:
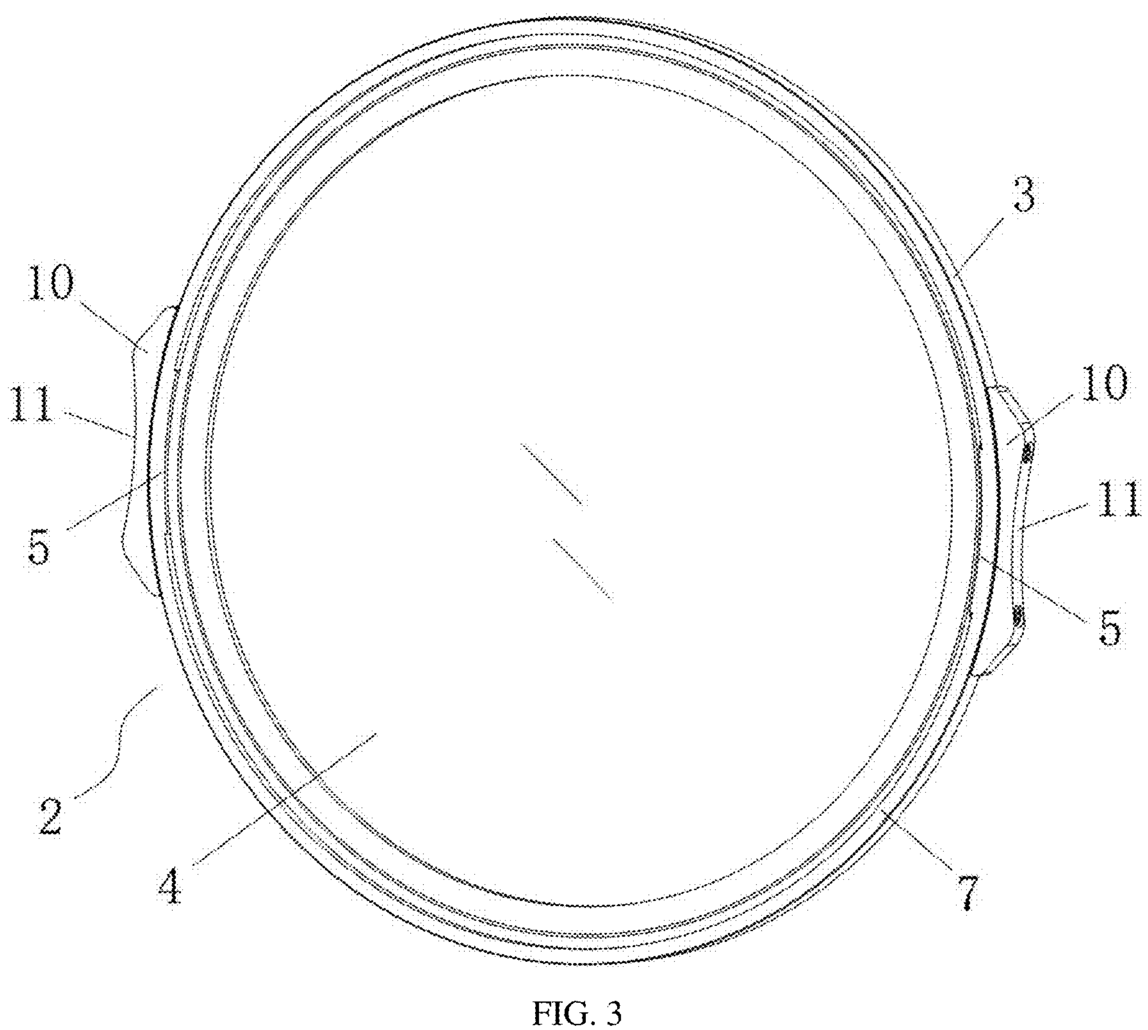
FIG. 3 is a schematic diagram of the front view structure of the filter in the magnetically attractable filter device according to an embodiment of the present disclosure.
Figure 4:
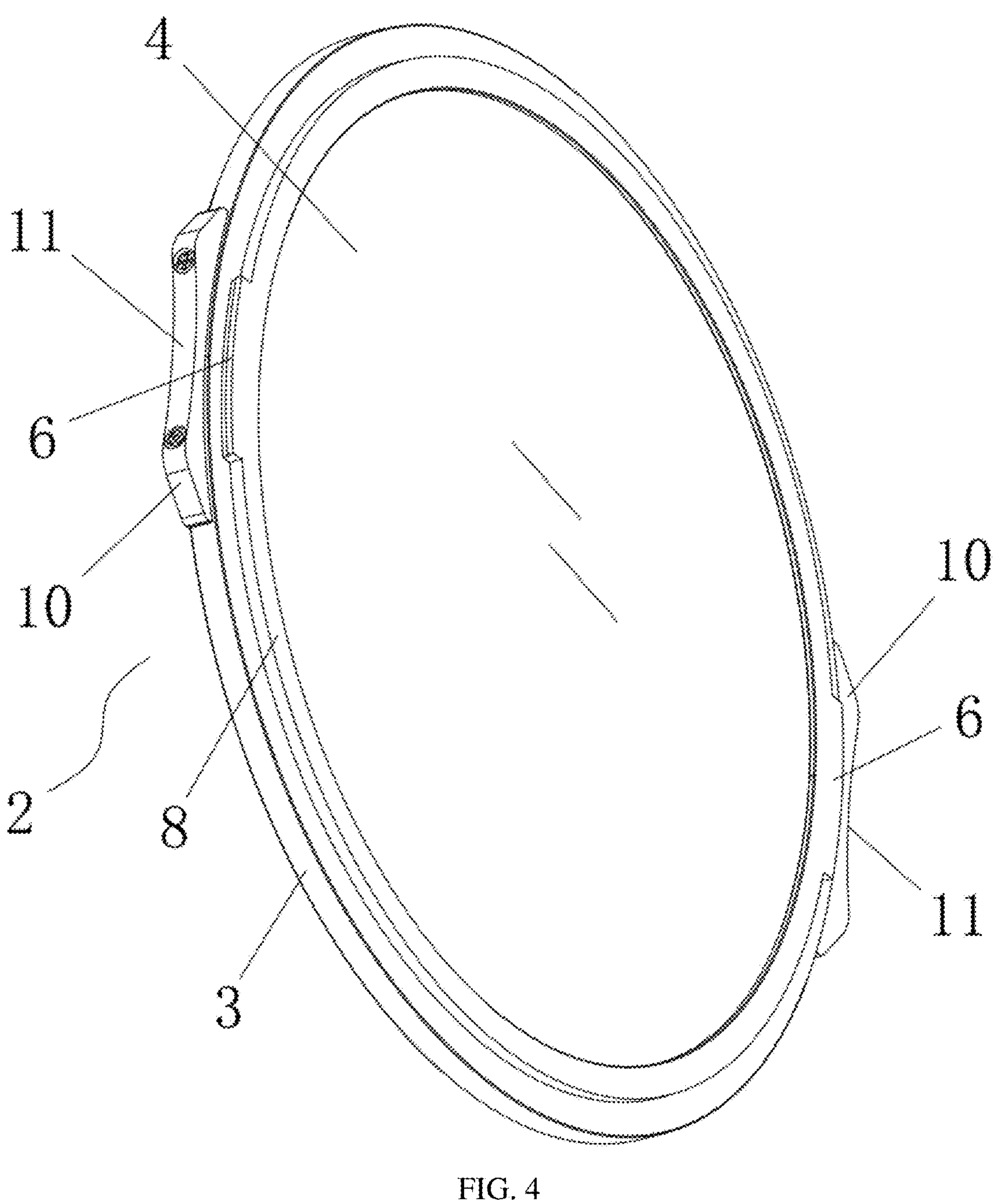
FIG. 4 is a schematic diagram of the rear view structure of the filter in the magnetically attractable filter device according to an embodiment of the present disclosure.

To address this, as shown in FIGS. 1, 3, and 4, a peripheral surface of the filter frame 3 is provided with a lug 10. Preferably, there are two (or optionally three or four or more) protruding lugs 10 arranged in an annular array on the peripheral surface of the filter frame 3. Specifically, the lugs 10 are mounted on the peripheral surface of the filter frame 3 using screws and may be integrated with the filter frame 3 as an integrated structure. When removing the filter 2, the user can easily and quickly complete the assembly and disassembly by gripping the corresponding lugs 10 with two or more fingers. The entire process avoids any contact with the lens element 4 of the filter 2, ensuring the lens element 4 remains clean and preventing scratches on the lens element 4, thereby improving shooting quality.

Preferably, the outer end of the lug 10 is provided with a recess 11 for ergonomic design, allowing the fingers to grip the lug 10 more stably and comfortably. The recessed surface of the recess 11 is provided with an anti-slip pattern. The anti-slip pattern may be a plurality of parallel horizontal grooves, interlaced mesh grooves, or one or more raised ribs. The anti-slip pattern increases the friction between the recess 11 and the fingers, further enhancing the stability and safety of the assembly and disassembly operations.

In addition, the peripheral surface of the adapter ring 1 is provided with a locking mark (not shown in the figure). The locking mark may be a colored marking area or a marking point. The locking mark is aligned with one of the first locking parts 5 on the adapter ring 1. When the lug 10 of the filter 2 is rotated to the locking mark, the second locking part 6 of the filter 2 engages with the first locking part 5 of the adapter ring 1, improving the accuracy and speed of the user's operation when rotating the filter 2 during its assembly and disassembly.

As shown in FIG. 1, the magnetically attractable filter device further comprises a protective cover 13. The protective cover 13 is stacked at a front end of the filter 2 when in use, and magnetically attracted to the filter 2. The magnetically attracted ends are respectively provided with the first locking part 5 and the second locking part 6. To facilitate the assembly and disassembly of the protective cover 13, the peripheral surface of the protective cover 13 may also be provided with lugs 10 similar to those of the filter 2.

In the embodiment described above, the first locking part 5 is provided on the inner wall of the first protruding ring 7, and correspondingly, the second locking portion 6 is provided on an outer wall of the second protruding ring 8. In other embodiments, the first locking part 5 is provided on the outer wall of the first protruding ring 7, and correspondingly, the second locking part 6 is provided on the inner wall of the second protruding ring 8. The front end surfaces of the adapter ring 1 and the filter frame 3 are both provided with a first protruding ring 7. The outer wall of the first protruding ring 7 is provided with the first locking portion 5. A rear end surface of the filter frame 3 is provided with a second protruding ring 8. The inner wall of the second protruding ring 8 is provided with the second locking portion 6 corresponding to the first locking portion 5. when assembled for use, the second protruding ring 8 and the second locking portion 6 are both arranged in an inner ring of the first protruding ring 7, and the second locking portion 6 engages with or disengages from the first locking portion 5 following a relative rotation of the second protruding ring 8 and the first protruding ring 7.

The described embodiment is only preferred embodiment of the present disclosure, and it should be noted that various improvements and modifications may be made therein by those of ordinary skill in the art without departing from the principle of the present disclosure and should also fall within the scope of protection of the present disclosure.

What is claimed is:

1. A magnetically attractable filter device, comprising:

an adapter ring, designed to be arranged at a front end of a lens; and one or more filters, each of the filters comprising a filter frame and a lens element, the lens element being mounted on the filter frame; when in use, the one or more filters being sequentially stacked at a front end of the adapter ring, and the adapter ring and adjacent filters being magnetically attracted to each other, and adjacent filters being magnetically attracted to each other;

wherein magnetically attracted ends of the adapter ring and the filter frames of the adjacent filters, and magnetically attracted ends of the filter frames of the adjacent filters are respectively provided with a first locking part and a second locking part; the first locking part and the second locking part engage with each other to achieve locking through mutual rotations between the adapter ring and the filter, and between the filters.

2. The magnetically attractable filter device according to claim 1, wherein front end surfaces of the adapter ring and the filter frame are both provided with a first protruding ring, the first protruding ring is provided with the first locking part, a rear end surface of the filter frame is provided with a second protruding ring, the second protruding ring is provided with the second locking part corresponding to the first locking part; when assembled for use, the second protruding ring and the second locking part are both arranged in an inner ring of the first protruding ring, and the second locking part engages with or disengages from the first locking part following a relative rotation of the second protruding ring and the first protruding ring.

3. The magnetically attractable filter device according to claim 2, wherein the number of the first locking parts is two or more, and the first locking parts are distributed in a ring shape on the first protruding ring; the number of the second locking parts is two or more, and the second locking parts are distributed in a ring shape on the second protruding ring.

4. The magnetically attractable filter device according to claim 3, wherein the first protruding ring is provided with two, three, or four of the first locking parts, the first locking parts are arranged in an annular array; and the second protruding ring is provided with two, three, or four of the second locking parts, the second locking parts are also arranged in an annular array.

5. The magnetically attractable filter device according to claim 4, wherein the first locking part is provided on an inner wall of the first protruding ring, and correspondingly, the second locking part is provided on an outer wall of the second protruding ring.

6. The magnetically attractable filter device according to claim 4, wherein the first locking part is provided on an outer wall of the first protruding ring, and correspondingly, the second locking part is provided on an inner wall of the second protruding ring.

7. The magnetically attractable filter device according to claim 3, wherein the first locking part protrudes and extends towards an axial direction of the first protruding ring, and forms a locking position on the first protruding ring; when locked, the second locking part rotates into the locking position and engages with the first locking part.

8. The magnetically attractable filter device according to claim 2, wherein a peripheral surface of the filter frame is provided with a lug to facilitate assembly and disassembly of the filter.

9. The magnetically attractable filter device according to claim 8, wherein an outer end of the lug is provided with a recess, and a recessed surface of the recess is provided with an anti-slip pattern.

10. The magnetically attractable filter device according to claim 8, wherein the number of the lugs is two or more, and the lugs are arranged in an annular array on the peripheral surface of the filter frame.

11. The magnetically attractable filter device according to claim 8, wherein a peripheral surface of the adapter ring is provided with a locking mark, and the locking mark is aligned with one of the first locking parts on the adapter ring.

12. The magnetically attractable filter device according to claim 1, further comprising a protective cover, the protective cover being stacked at a front end of the filter when in use, and magnetically attracted to the filter, and the magnetically attracted ends being respectively provided with the first locking part and the second locking part.

* * * * *